May 2, 1944.　　　S. ARONOFF　　　2,347,700

CAMERA SHUTTER

Filed Feb. 16, 1942

INVENTOR
SAMUEL ARONOFF
BY
ATTORNEYS

Patented May 2, 1944

2,347,700

UNITED STATES PATENT OFFICE 2,347,700

CAMERA SHUTTER

Samuel Aronoff, Dayton, Ohio

Application February 16, 1942, Serial No. 431,119

17 Claims. (Cl. 95—53)

(Granted under the act of March 3, 1883, as amended April 30, 1928; 370 O. G. 757)

The invention described herein may be manufactured and used by or for Government for governmental purposes, without the payment to me of any royalty thereon.

This invention relates to improvements in camera shutters, and more particularly to those shutters which are suitable for use on large, high-speed cameras of the type used in aerial photography.

The present-day aerial cameras require large shutters capable of operating at high speeds and with great accuracy. It has been found very difficult to obtain such a shutter, this being mainly due to the fact that the moving parts are quite large and hence possess considerable inertia. The use of powerful springs for the purpose of overcoming this resistance to change in movement is not a satisfactory solution to the problem, due to the increased size of the parts required to withstand the strain imposed upon them by the heavier springs. Difficulty is also experienced in securing accurate exposure times with the conventional shutters because of variations in the strength of the springs which cause corresponding variations in the operating speed of the shutters. It is particularly important in the case of high-speed shutters that the shutter speeds be held within very close limits, since the shorter the exposure, the greater will be the error occasioned by a small variation in the time of exposure. For example, in a shutter operating at one one-thousandth of a second, a variation of one one-thousandth of a second in its speed of operation will result in a halving or a doubling of the exposure. This, of course, will result in an underexposed or an overexposed negative and may mean the loss of an extremely valuable negative which cannot be replaced.

With a view to overcoming these difficulties, I have devised a new type of shutter which does not depend upon springs for its source of motivation and in which the problem of inertia is no longer present. This is made possible through the use of a constantly rotating disk having an aperture which passes through the optical axis and uncovers the optical system for a brief instant on each revolution of the disk. In this manner it is possible to secure very accurately timed exposures so long as the disk rotates with a constant speed. A supplementary screening disk is employed for the purpose of keeping the system covered at all times except when an exposure is to be made. At such time, the screening disk is moved so as to uncover the system during the instant that it is uncovered by the rotating disk, after which the screening disk again covers the system so as to prevent a double exposure as the aperture in the disk comes around again. Thus, a very rapid and accurate exposure may be made in a camera of unlimited size by the use of my mechanism.

Accordingly, one of the objects of my invention is to provide a high-speed shutter suitable for use on large cameras of the type used in aerial photography. In so doing, I have devised a means for making very rapid exposures with extreme accuracy, the means employed being quite simple in nature and very reliable in operation.

Another object of my invention is to provide a high-speed shutter for cameras in which the exposure is made by the uncovering of the optical system by an aperture located near the periphery of a rapidly rotating disk.

A further object of my invention is to provide a high-speed shutter for cameras in which a screening disk is employed in conjunction with the rotating disk for the purpose of covering the optical system at all times except for the brief instant when an exposure is being made.

Still a further object of my invention is to provide a high-speed shutter for cameras in which means is provided for synchronizing the movement of the screening disk with that of the rotating disk so that when an exposure is made, both will uncover the optical system at the same instant.

In general, my device is comprised of a rapidly rotating disk which has provided therein an aperture so located as to pass through the optical axis of the system on each rotation of the disk. In this manner it is possible to obtain very high exposure speeds and at the same time to secure a very high degree of accuracy in exposure times. In order to prevent an exposure's being made on each rotation of the disk as the aperture passes through the optical axis, a screening plate is provided beneath the rotating disk for the purpose of keeping the system covered at all times except when an exposure is to be made. This screening plate contains an aperture similar to the one in the disk but lying normally out of line therewith except at such times as an exposure is to be made. At this time the plate is moved in such a manner as to cause the aperture therein to pass through the optical axis at the same instant that the aperture in the rotating disk passes therethrough. This allows a momentary beam of light to pass through the optical system, thus causing an exposure to be made. The means for moving the plate is synchronized with the movement of the rotating disk so as to cause the aperture in the plate to pass through the optical axis at the same instant that the aperture in the disk passes therethrough. In order to prevent a second exposure of the film from taking place as the screening plate is restored to its original position, a resetting plate is provided beneath the screening plate for the purpose of covering the aperture therein during the restoring movement.

The shutter hereinafter described is a modification of the camera shutter illustrated and described in copending application Serial No. 431,079, filed on February 16, 1942, by Magnus and Aronoff. For this reason no claim is made in the instant application to the broad aspects of the invention, this subject matter being claimed in the aforementioned application of Magnus and Aronoff.

A preferred embodiment of the present invention will be hereinafter described with reference to the accompanying drawing, given merely by way of example, in which.

Figures 1, 2:
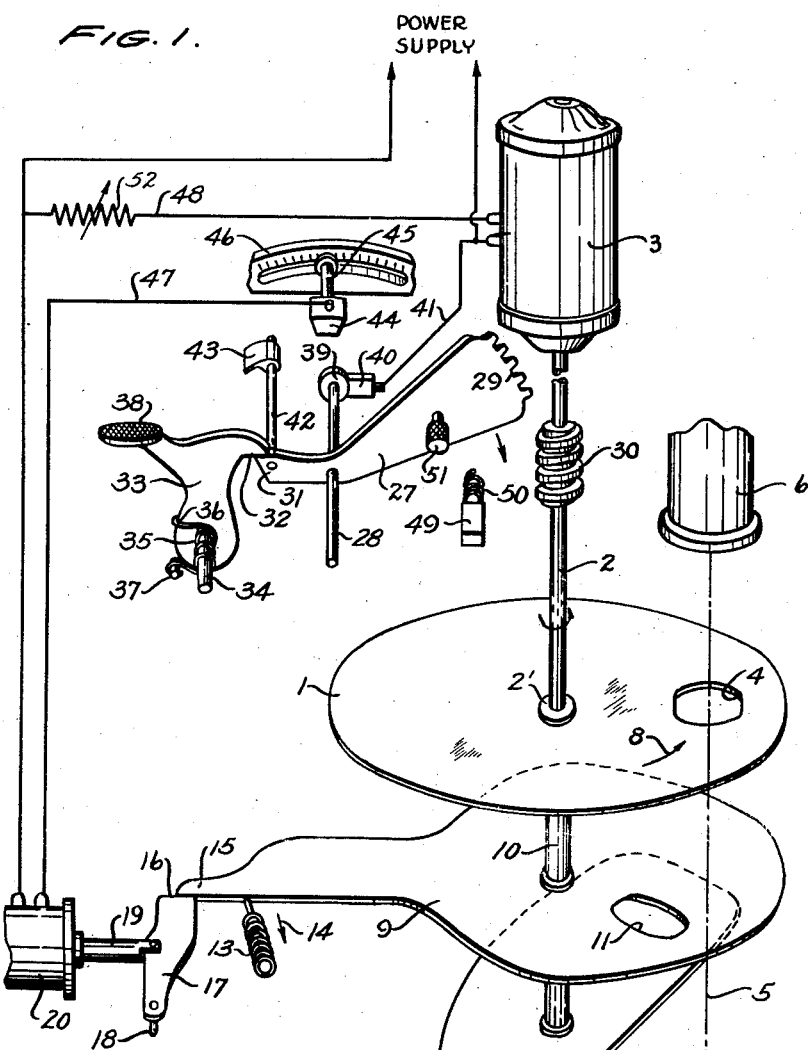
Fig. 1 is a perspective view of a device embodying my invention with the various parts occupying their normal rotational positions but being spaced widely apart in a vertical direction in order to better show the construction thereof.
Fig. 2 shows a modification of the worm and sector synchronizing mechanism illustrated in Fig. 1.

As shown in Fig. 1, my improved shutter consists of a constantly rotating disk 1 which is seated against and rigidly secured to a flange 2' formed on a shaft 2. This shaft is rotated with constant speed in a counterclockwise direction by means of a small, direct-current motor 3. The disk 1 is provided with an aperture 4 so located as to pass through the optical axis 5 of the lens system 6, 7 on each revolution of the disk. In this manner, the aperture in the disk will be caused to pass through the optical axis from left to right, or in the direction of the arrow 8, on each revolution of the disk. Situated below the disk 1 is a screening plate 9 pivotally mounted on a sleeve 10, the upper end of which serves as a bearing support for the bottom of the shaft 2. This plate is provided with an aperture 11 which, as shown in Fig. 1, normally lies out of line with the optical axis 5 when the plate is in its normal position. The plate 9 is urged by a spring 13 in the direction of the arrow 14, thus tending to move the aperture 11 through the optical axis in a left-to-right direction as viewed in the figure. Such movement is normally prevented by the engagement of a nose 15 on the plate 9 against the blunt end 16 of a latch 17 pivotally mounted in the framework of the shutter at 18. The armature 19 of the solenoid 20 is pivotally connected to the latch so as to move the latter in a counterclockwise direction when the solenoid is energized, thus releasing the plate 9 for movement under the influence of the spring 13. Lying below the plate 9 is a resetting plate 21 which is likewise pivotally mounted on the sleeve 10, this plate being held by a spring 22 in contact with a stationary block 23. The plate 21 is of solid construction, there being no apertures therein, and when in the position shown in the figure, this plate is in such position as not to interfere with the light passing through the optical system of the camera. A resetting knob 24 is provided on the plate 21 in order that the same may be swung by the operator in a clockwise direction when resetting the shutter. This plate is also provided with an upstanding pin 25 which engages the forward edge of plate 9 when the shutter is being reset.

A sector 27 is pivotally mounted on a shaft 28, this sector being provided with teeth 29 adapted for engagement with a single-threaded worm 30 fast on the shaft 2. The sector is weighted so that it will normally tend to rotate about the shaft 28 in a clockwise direction from the position shown in the figure. Such movement is normally prevented, however, by a nose 31 on the sector engaging with a blunt face 32 provided on a latch 33. This latch is pivotally mounted on a shaft 34, supported in the framework of the shutter, and is urged in a clockwise direction by means of the torsion spring 35, one end of which engages with the rear edge of the latch as at 36 while the other end of the spring is wrapped around a pin 37 mounted in the shutter framework. The latch 33 is provided with a thumb plate 38 so that the operator may, by pressing down on this plate, rock the latch in a counterclockwise direction to thereby release the sector 27 so as to permit it to drop into engagement with the worm 30. The shaft 28 on which the sector 27 is mounted is provided with a slip ring 39 which is engaged by a brush 40 electrically connected by the wire 41 with one side of the power supply. Fastened to the left-hand end of the sector 27 is a short rod 42, on the end of which is mounted a brush 43. This brush is arranged to engage with a contact block 44 mounted on the end of a rod 45 adjustably mounted in a slot formed in the sector 46. The contact block 44 is electrically connected by a conductor 47 to one side of the solenoid 20, the other side of which is connected by a conductor 48 to the power supply as shown in the figure. A stop 49 is provided to catch the sector 28 after it has passed through the worm 30. In order to reset the sector to the position shown in the figure, the block 49 may be pushed rearwardly against the pressure of the compression spring 50 and the sector swung clockwise around into normal position by means of the finger grip 51 thereon. The sector 27 is slightly bent at the point where it is pivotally mounted on the shaft 28 so that the right-hand end of the sector will not strike against the latch 33 as it is being swung around into its original position.

The operation of the device is as follows:

With the motor 3 operating to constantly rotate the worm 30 and the disk 1 in a counterclockwise direction, the shutter may be operated to effect an exposure of the film in the camera by manipulating the latch 33 to release the sector 27. The sector will then drop into engagement with the worm 30 and be carried through the worm as the latter rotates. At a predetermined point in the travel of the sector through the worm, the brush 43 will make contact with the block 44 to thereby energize the solenoid 20 and release the screening plate 9 for movement in the direction of the arrow 14 under the urgency of the spring 13. This will carry the aperture 11 in the plate through the optical axis 5 in a direction from left to right or in the same direction as that pursued by the aperture in the disk 1 as it passes through the optical axis. The contact block 44 is adjusted along the sector 46 to such a point that contact will be made and the plate 9 released at the proper moment to cause the aperture 11 in the plate to pass through the optical axis at the same time that the aperture 4 in the rotating disk 1 passes therethrough. For obtaining maximum duration of exposure, both disk and plate 9 should travel at substantially the same speed when passing through the optical axis. For obtaining minimum duration of exposure, it is necessary that there be a maximum difference between the speeds of the disk and the plate. However, the limit of the difference of speeds must be such as to prevent double exposure, which requires that the plate 9 have a speed such that the disk 1 will not make more than one complete revolution during the time when the aperture 11 of plate 9 is passing through the optical axis. The aperture 11 in the plate 9 is carried beyond the optical axis as the plate continues its rotation and, when the plate comes to rest against the pin 25, the aperture will lie out of line with this axis so as to again obstruct the passage of light through the optical system. Thus, although the disk 1 is constantly rotating and will uncover the optical system at frequent intervals, an exposure can be made only when the latch 33 is manipulated, and the action of the screening plate will insure that only a single exposure is made.

After exposure, the shutter is reset by the operator's grasping the knob 24 of the reset plate 21 and swinging the same in a clockwise direction against the pull of the spring 22. The pin 25 mounted in the reset plate will carry the screening plate along with it, and both plates are thus moved together in a clockwise direction until the screening plate is again latched by 17. During this operation the plate 21 covers the aperture 11 in the screening plate so that there is no possibility of an exposure's being made while the plate is being reset to its normal position.

In order that the shutter speed may be varied as desired, a rheostat 52 is placed in the motor circuit for the purpose of controlling the speed of the motor 3 and thereby also the speed of the disk 1.

A modification of the worm-and-sector synchronizing mechanism is shown in Fig. 2. As here shown, a cam 54 replaces the worm 30 on shaft 2, this cam being formed with an abrupt nose 55 for actuating the follower arm 56. The cam has integrally formed thereon a collar 57 in which is located a setscrew 58 for enabling the annular position of the cam on the shaft to be varied according to requirements. The follower arm 56 is constructed of a thin strip of metal which is pivotally mounted at its left-hand end in a vertical slot cut in a stationary metal block 59. The right-hand end of the arm is thus free to be moved up or down about the pivot point located in the left-hand end of the arm, but is denied freedom of movement in a horizontal plane. The right-hand end of the arm is provided with a contact button 60 which is adapted, upon occasion, to strike against a similar button provided on the right-hand end of a stationary metal arm 61. The latter arm is pinned at its left-hand end to the stationary block 59 and is insulated therefrom by a block of insulating material 62. The arm 56 is urged to its lowermost position as shown in Fig. 2 by a light spring 63, a limit pin 64 being provided for the purpose of determining the lower limit of movement of the arm. When the arm is in this position it lies immediately in front of the cam 54 and its contact button is directly opposite the button carried by arm 61. When the arm 56 is lifted by the operator by means of finger piece 65 into its raised position, it will be retained in this position against the urgency of spring 63 by means of a latch 66 pivoted in the shutter frame at 67. The latch is provided with a shoulder 68 which is moved under the lower edge of arm 56 by a spring 69 when the arm is raised. The modified synchronizing device is connected into the electrical circuit in the same manner as the worm and sector mechanism, the conductor 41 being connected to the block 59, and the conductor 47 being connected to the arm 61.

The operation of the modified form of mechanism is as follows: The device is set or cocked ready for operation by the operator's grasping the finger piece 65 and lifting the arm 56 into its raised position where it is retained by the latch 66. In this position of the arm, the lower edge thereof lies above the upper face of the cam, and the nose 55 passes idly underneath the arm on each revolution of shaft 2. The shutter is tripped for operation by the operator's pushing rearwardly on the upper end of the latch to free the arm 56 to the pull of the spring 63. If the nose of the cam is passing underneath the arm at the time the latch is released, the arm will drop down on top of the cam where it will rest until the nose has passed by, at which time it will continue its downward movement until it strikes the pin 64. When the nose of the cam again comes around to the position shown in Fig. 2, the arm 56 will be flexed by the pressure of the nose thereon and the contacts will be momentarily closed. The time of closing of the contacts with relation to the position of the aperture 4 may be varied by releasing the setscrew 58 and rotating the cam around on the shaft 2.

The spacing between the disk and the plates 9 and 21 in the figure is greatly exaggerated for the purpose of more clearly showing their arrangement and construction. In actual practice these plates would be spaced very closely together with just enough room between them to permit the free operation of the shutter.

While, in the particular embodiment of the invention herein described, the disk is rotated in a counterclockwise direction, or in the same direction as the plate 9, it is to be understood that the shutter will operate just as satisfactorily with the disk rotating in the reverse direction. In fact, when the disk and plate are rotated in opposite directions a higher shutter speed will result due to the combined effect of the disk and plate in controlling the time of exposure. A somewhat different effect as regards the exposure of the film will result from the two types of operation, however. In the type of operation wherein the disk and plate both rotate in the same direction, the disk, because of its greater speed, will control the time of exposure. In other words, the plate may, for all practical purposes, be considered as stationary after its aperture 11 reaches the position where it uncovers the optical system, while the aperture 4 in the disk may be considered as rapidly passing through the optical axis so as to momentarily uncover the optical system. During the passage of the aperture 4 through the optical axis, the side of the film first uncovered by the right-hand edge of the aperture will be the first to be covered by the left-hand edge thereof, and thus all parts of the negative will be exposed for the same length of time. This is a very desirable result, and for this reason the type of operation shown in the drawing is probably the most preferable one. In the alternate type of operation—that is, with the disk and the plate moving in opposite directions—the plate can no longer be considered as stationary, and the apertures in the disk and the plate will effect a scissors action on the light passing through the optical system. This will mean that the center of the negative will be the first to be uncovered by the apertures and the last to be covered by the edges of the disk and the plate. Hence, the center of the film will be exposed for a longer period of time than the edges, and perfect uniformity of the negative will not be secured. In some cases, of course, this disadvantage may be outweighed by the advantage of the higher shutter speeds obtainable with the disk and the plate moving in opposite directions.

In lieu of plates 9 and 21 illustrated in Fig. 1, I may use one circular plate in the approximate position of plate 9, having an aperture spaced radially from shaft 10 in the same position as aperture 11. This plate would be provided with an extension similar to extension 15 of plate 9, which would abut latch 17 in the same manner as illustrated. However, in this arrangement, springs 13, 22, and block 23 would also be omitted. The functions performed by these members would be accomplished by a torsion spring having one end associated with the circular plate and the other end secured to an annular ratchet member mounted on sleeve 10. The ratchet member is secured against counterclockwise rotation, but is rotatable clockwise to restore the energy of the spring after release of latch 17 and movement of the screening member.

In operation, this form of the invention would function as follows: Upon actuation of the solenoid 20, the latch 17 disengages extension 15, and plate 9 rotates one revolution, carrying aperture 11 through the optical axis and coming to rest by engagement of extension 15 with latch 17 which will have returned to its original position during this revolution. In this design, no corresponding plate such as shield 21 is necessary, since the aperture 11 does not return through the optical axis. After operation, the energy of the torsion spring is restored by a following-up rotation of the ratchet member.

From the above description of my invention it will be seen that I have provided a camera shutter which is capable of operating at very high exposure speeds, even when made of a size suitable for use in the present-day large aerial cameras. At the same time, the exposures will be of a very uniform nature, the underlying principles of my invention being such as to eliminate the possibility of any substantial error in the time of exposure. This is all accomplished in the simplest possible manner, the shutter being composed of only a few commonplace elements which are herein combined in a novel manner capable of producing the highly beneficial results mentioned above.

Having thus described my invention, what I claim as new and desire to secure by Letters Patent is:

1. In a shutter for controlling the passage of light through the optical system of a camera, the combination of a rotating shutter lying in the path of the light passing through the system, said shutter having an aperture therein which passes through the optical axis of the system with each rotation of the shutter, a screening member likewise lying in the path of the light passing through the system and having a normal position and a moved position, said member being provided with an aperture which lies out of line with the optical axis when said member is in either its normal or its moved position but which passes through the optical axis as said member passes from its normal to its moved position, means for moving said member from its normal to its moved position, and means operable in accordance with the movement of said shutter for so controlling said moving means as to cause the aperture in said member to pass through the optical axis at the same time that the aperture in said shutter passes therethrough.

2. In a shutter for controlling the passage of light through the optical system of a camera, the combination of a shutter rotating at a substantially constant speed and lying in the path of the light passing through the system, said shutter having an aperture therein which passes through the optical axis of the system with each rotation of the shutter, a screening member likewise lying in the path of the light passing through the system and having a normal position and a moved position, said member being provided with an aperture which lies out of line with the optical axis when said member is in either its normal or its moved position but which passes through the optical axis as said member passes from its normal to its moved position, means for constantly urging said member toward its moved position, means for retaining said member in its normal position, and means operable in accordance with the movement of said shutter for disabling said retaining means at the proper moment to cause said urging means to move the aperture in said member through the optical axis at the same time that the aperture in said shutter passes therethrough.

3. In a shutter for controlling the passage of light through the optical system of a camera, the combination of a rotating shutter lying in the path of the light passing through the system, said shutter having an aperture therein which passes through the optical axis of the system on each rotation of the shutter, a screening member likewise lying in the path of the light passing through the system and having a normal position and a moved position, said member being provided with an aperture which lies out of line with the optical axis when said member is in either its normal or its moved position but which passes through the optical axis as said member passes from its normal to its moved position, means for constantly urging said member toward its moved position, means for retaining said member in its normal position, a driving member moving in synchronism with said rotating shutter, a driven element selectively engageable with said driving member, and means actuated by said element in a predetermined position thereof for disabling said retaining means and thereby causing the aperture in said screening member to pass through the optical axis at the same time that the aperture in said shutter passes therethrough.

4. In a shutter for controlling the passage of light through the optical system of a camera, the combination of a constantly rotating disk situated with its plane at right angles to the optical axis of the system and lying in the path of the light passing therethrough, said disk having an aperture therein which passes through the optical axis on each rotation of the disk, a screening plate situated in overlapping relationship with respect to said disk and having an aperture lying normally out of line with the optical axis, means for moving said screening plate to carry the aperture therein through the optical axis, and means, operating in accordance with the movement of said disk, for so controlling said moving means as to cause the aperture in said plate to pass through the optical axis at the same time that the aperture in said disk passes therethrough.

5. In a shutter for controlling the passage of light through the optical system of a camera, the combination of a shaft rotating at a substantially constant speed and lying parallel to the optical axis of the system, a disk on said shaft having a radius substantially greater than the distance between said shaft and the optical axis, said disk having an aperture therein which passes through the optical axis on each rotation of the disk, a screening plate situated in overlapping relationship with respect to said disk and having a normal position and a moved position, said plate being provided with an aperture which lies out of line with the optical axis when the plate is in either its normal or its moved position but which passes through the optical axis as the plate moves from its normal to its moved position, spring means constantly urging said plate toward its moved position, means for retaining said plate in its normal position, a worm on said shaft, a toothed sector selectively engageable with said worm, and means actuated by said sector in a predetermined position thereof for disabling said retaining means and thereby causing the aperture in said plate to pass through the optical axis at the same time that the aperture in said disk passes therethrough.

6. In a shutter for controlling the passage of light through the optical system of a camera, the combination of a shaft rotating at a substantially constant speed and lying parallel to the optical axis of the system, a disk on said shaft having a radius substantially greater than the distance between said shaft and the optical axis, said disk having an aperture therein which passes through the optical axis on each rotation of the disk, a screening plate situated in overlapping relationship with respect to said disk and having a normal position and a moved position, said plate being provided with an aperture which lies out of line with the optical axis when the plate is in either its normal or its moved position but which passes through the optical axis as the plate moves from its normal to its moved position, spring means constantly urging said plate toward its moved position, means for retaining said plate in its normal position, a cam on said shaft, a follower arm selectively engageable with said cam, and means actuated by said follower arm in a predetermined position of said cam for disabling said retaining means and thereby causing the aperture in said plate to pass through the optical axis at the same time that the aperture in said disk passes therethrough.

7. In a shutter for controlling the passage of light through the optical system of a camera, the combination of a shaft rotating at a substantially constant speed and lying parallel to the optical axis of the system, a disk on said shaft having a radius substantially greater than the distance between said shaft and the optical axis, said disk having an aperture therein which passes through the optical axis on each rotation of the disk, a screening plate situated in overlapping relationship with respect to said disk and having a normal position and a moved position, said plate being provided with an aperture which lies out of line with the optical axis when the plate is in either its normal or its moved position but which passes through the optical axis as the plate moves from its normal to its moved position, spring means constantly urging said plate toward its moved position, means for retaining said plate in its normal position, a worm on said shaft, a toothed sector urged toward engagement with said worm, a manipulative member normally holding said sector disengaged from said worm, and means actuable by said sector when released by said manipulative member for disengaging said retaining means at a predetermined position of said sector in its travel through said worm to thereby cause the aperture in said plate to pass through the optical axis at the same time that the aperture in said disk passes therethrough.

8. The invention as defined in claim 6, wherein the selective engagement of said follower arm with said cam is controlled by a manipulative member normally holding said follower arm disengaged from said cam but enabling engagement of said follower arm with said cam upon manipulation thereof.

9. The invention as defined in claim 1, wherein means is provided for returning said screening member from its moved position to its normal position.

10. The invention as defined in claim 1, wherein means is provided for returning said screening member from its moved position to its normal position, said means being further effective to shield said aperture in said screening member during the movement thereof from said moved position to said normal position.

11. The invention as defined in claim 3, wherein means are provided for varying the position at which said driven element is effective for disabling said retaining means to thereby adjust the relative coincidence at which the apertures in said shutter and screening member pass through the optical axis.

12. In a shutter for controlling the passage of light through the optical system of a camera, the combination of a rotating shutter lying in the path of the light passing through the system, said shtuter having an aperture therein which passes through the optical axis of the system on each rotation of the shutter, a screening member likewise lying in the path of the light passing through the system and being provided with an aperture so positioned as to be registrable with said optical axis upon movement of said member, said screening member having a normal stationary position wherein said aperture lies out of line with said axis, means for moving said member, and means operable in accordance with the movement of said shutter for so controlling said moving means as to cause the aperture in said member to pass through the optical axis at the same time that the aperture in said shutter passes therethrough.

13. In a shutter for controlling the passage of light through the optical system of a camera, the combination of a shutter rotating at substantially constant speed and lying in the path of the light passing through the system, said shutter having an aperture therein which passes through the optical axis of the system on each rotation of the shutter, a screening member likewise lying in the path of the light passing through the system and being provided with an aperture so positioned as to be registrable with said optical axis upon movement of said member, said screening member having a normal stationary position wherein said aperture lies out of line with said axis, means for moving said member, and means operable in accordance with the movement of said shutter for so controlling said moving means as to cause the aperture in said member to pass through the optical axis at the same time that the aperture in said shutter passes therethrough.

14. The invention as defined in claim 13, wherein means is provided for varying the speed of rotation of said shutter.

15. In a shutter for controlling the passage of light through the optical system of a camera, the combination of an electric circuit, a rotating disk lying in the path of light passing through the system, said disk having an aperture therein which passes through the optical axis of the system with each rotation of the disk, an electric motor in said electric circuit for driving said disk, a screening member likewise lying in the path of the light passing through this system and having a normal stationary position wherein light is prevented from passing through said system, means for moving said member, electromechanical means connected in said electric circuit for releasably retaining said member in its normal position, electric contact means operable in accordance with the movement of said disk for closing said electric circuit to said electromechanical means at the proper moment to cause said moving means to move said screening member so as to uncover the optical axis at the same time that the aperture in said shutter passes therethrough.

16. The invention as defined in claim 15, wherein said electrical contact means are adjustable for varying the instant of release of said screening member in relation to the movement of said disk.

17. The invention as defined in claim 15, wherein the electric motor is of the constant-speed type and wherein there is further provided a variable-resistance means in the electrical circuit to said motor for varying the speed of rotation of said disk.

SAMUEL ARONOFF.